Aug. 29, 1967  A. ORTELLI  3,338,642
TUBULAR RECTILINEAR GUIDE MEMBER FOR TELESCOPICALLY
EXTENSIBLE RODS, TUBES, SHAFTS AND THE LIKE
Filed July 29, 1965  2 Sheets-Sheet 1
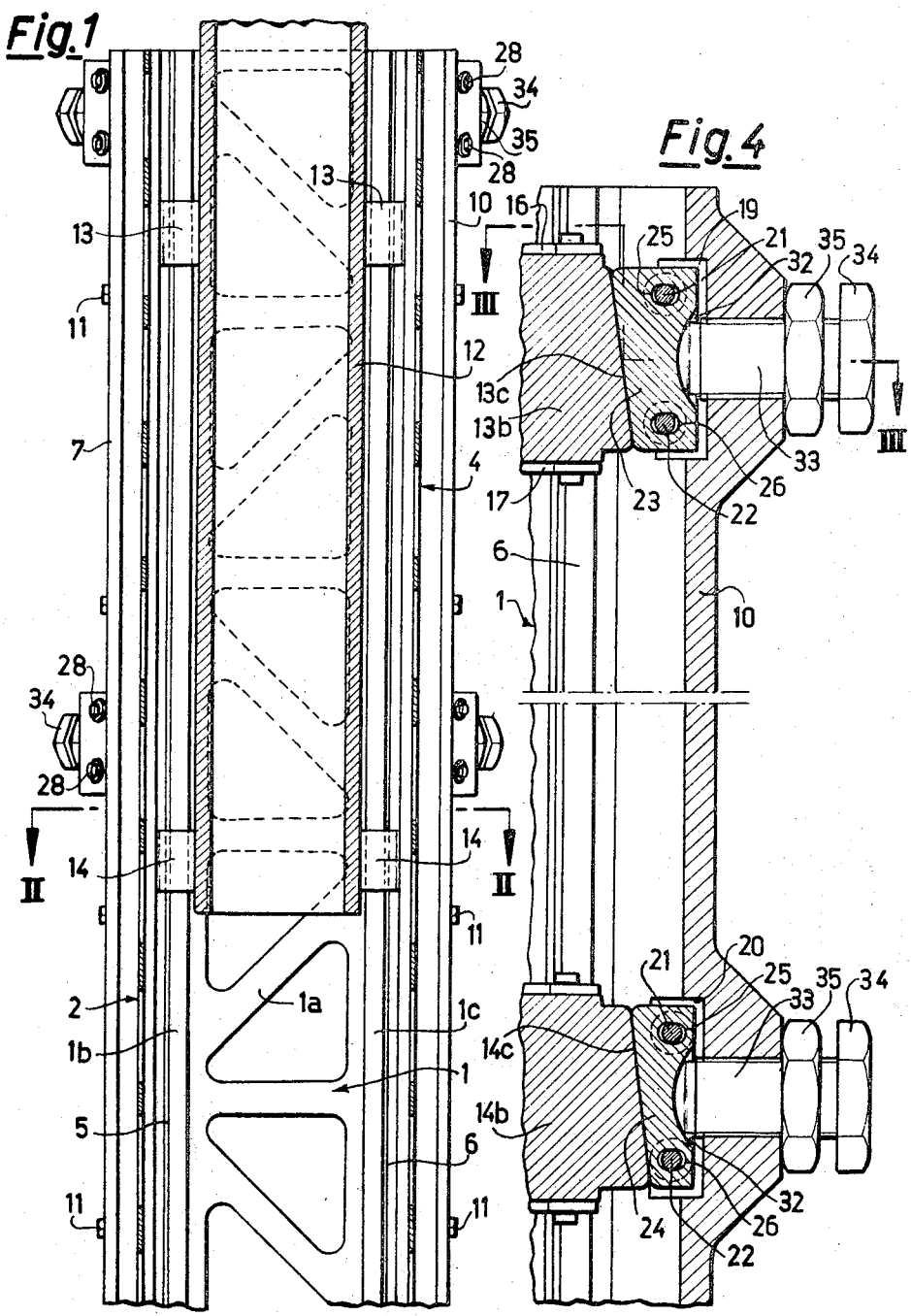

Aug. 29, 1967   A. ORTELLI   3,338,642
TUBULAR RECTILINEAR GUIDE MEMBER FOR TELESCOPICALLY
EXTENSIBLE RODS, TUBES, SHAFTS AND THE LIKE
Filed July 29, 1965   2 Sheets-Sheet 2
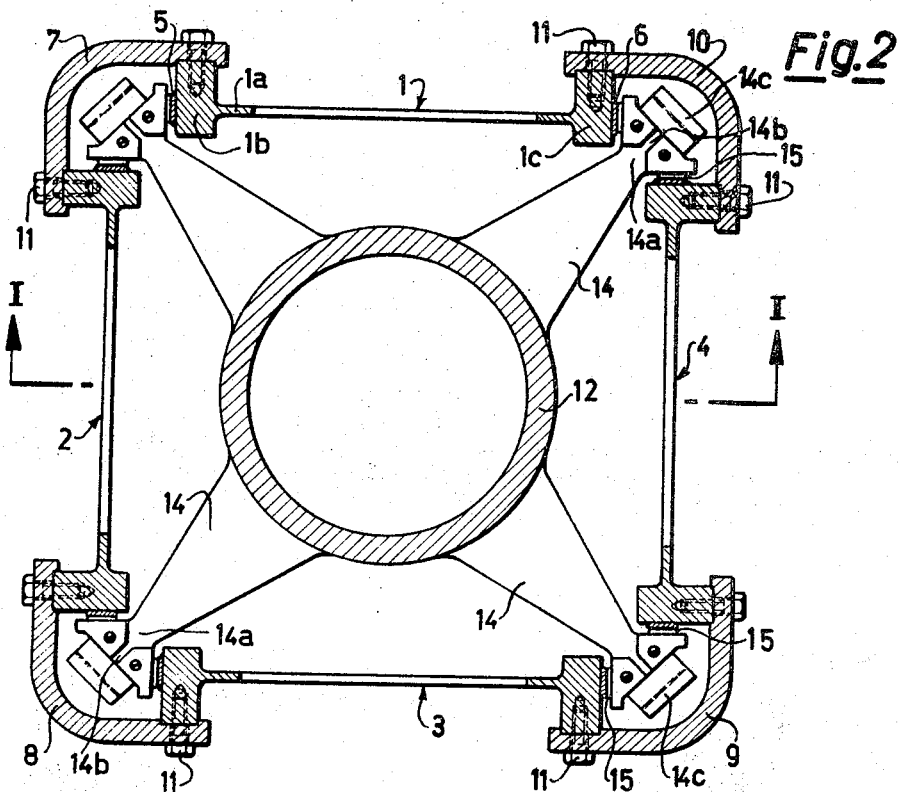
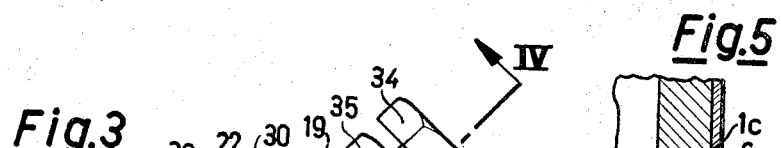
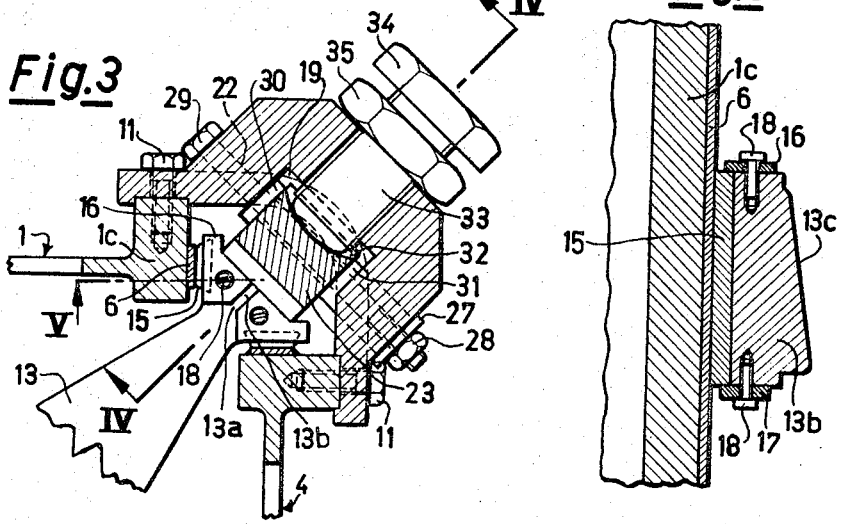

United States Patent Office 3,338,642
Patented Aug. 29, 1967

3,338,642
TUBULAR RECTILINEAR GUIDE MEMBER FOR TELESCOPICALLY EXTENSIBLE RODS, TUBES, SHAFTS AND THE LIKE
Aurelio Ortelli, Bologna, Italy, assignor, by mesne assignments, to Riva Calzoni S.p.A.
Filed July 29, 1965, Ser. No. 475,838
Claims priority, application Italy, Aug. 6, 1964, Patent 735,734
7 Claims. (Cl. 308—3)

The present invention relates to a tubular rectilinear guide member for telescopically extensible rods, tubes, shafts and the like.

It is the main object of this invention to provide a light structure guide member that is at the same time suitable to support heavy transverse loads, to allow an easy, economic and accurate manufacture of the sliding surfaces and permit a rapid assembly and disassembly of the guide member itself.

The tubular rectilinear guide member according to the invention comprises a plurality of double T-shaped beams, the cores of which form the guide walls and the booms of which are spaced and two by two rigidly connected to one another, each double T-shaped beam having two parallel sliding surfaces at the outer surfaces opposite the two booms, said sliding surfaces being arranged at right angles to the beam core plane with the centre lines thereof lying in said plane.

Particularly, the guide member may comprise from three to four double T-shaped beams and then may have six or eight sliding surfaces, respectively.

The rigid connection between the boom pairs of the beams may be carried out by means of union sections or by elements integral with the booms and suitable connection members so as to allow a rapid assembly and disassembly.

Core of the double T-shaped beams may be carried out with extreme lightness principles; more particularly, it may be of a small thickness plate, eventually provided with holes or lattice transbored and having stiffening bends in order to avoid local phenomena of elastic instability.

At the upper end of the guide member there may be provided means for eliminating the even small clearances between the guide sliding surfaces and the sliding blocks integral with the coaxial, movable guided member. Thus, it is possible to achieve an excellent locking of the movable member at the position of upper stroke and with even slight transverse movements being prevented.

The invention will be hereinafter described in an exemplifying embodiment thereof, shown in the drawing, in which:

FIGURE 1 shows a longitudinal cross section, taken along the line I—I of FIGURE 2, of the guide member and a tubular guided member;

FIGURE 2 shows a transverse cross section of the same guide member and guided member, taken along the line II—II of FIGURE 1;

FIGURE 3 is a detail view of the upper locking means at an angle of the guide member in a transverse cross section taken along the line III—III of FIGURE 4;

FIGURE 4 shows a longitudinal cross section of said angle of the guide member in a longitudinal cross section taken along the line IV—IV of FIGURE 3; and FIGURE 5 is a sectional detail view taken along the line V—V of FIGURE 3.

In the shown embodiment example, the tubular rectilinear guide member comprises four double T-shaped beams, indicated at 1, 2, 3 and 4 of FIGS. 1 and 2, respectively. In the present case, these four double T-shaped beams are perfectly identical, both as to shape and sizes, and therefore the description of one of them, for instance beam 1, will be sufficient. Core 1a of the beam is in a bored plate of a small thickness that has been transformed into a lattice (see FIGURE 1). Welded onto the upper opposite surfaces thereof at right angles to the plane of core 1a, the two booms 1b and 1c carry ledges 5 and 6, respectively, said ledges forming two sliding surfaces.

These two ledges, made of a suitable material such as stainless steel, have the centre lines thereof lying in the plane of the beam core 1a.

In a transverse cross section (FIGURE 2), the four double T-shaped beams are, with the cores thereof forming the guide walls, arranged along the sides of a square, with the booms that are spaced from one another and rigidly connected two by two by means of four section members, respectively indicated at 7, 8, 9 and 10, said member being as long as the beams themselves. In proximity of each of its ends to the inner surface, each of the section members has a longitudinal slot, into which the booms of two close beams are fitted and secured by means of screws 11.

Thus, the beams are two by two in a mutual locking condition, so that planes of cores thereof build up right angles.

In the present case, the movable member, coaxially guided into the guide member, comprises a cylindrical tube indicated at 12. Close to its lower end and in two spaced planes, said tube carries the radial arms 13 and 14, respectively. In the case shown, there are provided four arms in each of the two planes, said arms being displaced for 90° from one another.

With a tapered portion 13a and 14a, respectively, each arm 13 and 14 pass between a pair of spaced and rigidly connected booms forming a guide angle and are with their enlarged heads 13b and 14b, respectively, in the space defined by said pair of booms and the relative connecting section member. Said enlarged heads 13b and 14b of the arm have two exactly perpendicular planes, each carrying a sliding block 15 through which the head rests on two sliding ledges of the relative boom pair, as can be particularly clearly seen in FIGURE 2.

Sliding blocks 15 are preferably made of anti-frictional material and may be secured to the heads 13b and 14b of the arms 13 and 14, as shown in FIGS. 3 and 5. In this case, the cross section of the sliding block 15 is of a dovetail shape and the sliding block 15 is inserted in a corresponding slot of the head 13b. Two plates 16, 17, respectively secured above and under the head 13b by means of screws 18, hold the sliding block 15 in its seat and allow an easy quick replacement thereof.

The radially outer surfaces of the heads 13b and 14b are wedge-shaped with the larger base below, and the wedges of the heads of the lower arms 14, indicated at 14c, radially project for a larger amount than the wedges 13c of the heads of the upper arms 13.

When the tube 12 reaches in the guide the upper stroke end position, each of said wedges 13c and 14c can cooperate with a relative adjustable oscillating wedge, as shown in FIGS. 3 and 4.

As a matter of fact, the four section members 7, 8, 9 and 10 rigidly connecting the four double T-shaped beams 1, 2, 3 and 4 of the guide member, have recesses 19 and 20, respectively, on the upper side in two spaced planes. The distance between the two recess planes is equal to that between the two planes of the radial arms 13 and 14, respectively, integral with the tube 12.

In each recess 19 and 20 a wedge 23, and respectively 24, is mounted on two pins 21 and 22. Pins 21 and 22 pass through holes of the recess wall and slits 25 and 26 respectively of the relative wedge. At one end, said pins carry a hexagonal head 29 and the other end is threaded to receive a washer 27 and a locking nut 28. Between the recess wall and the wedge there is inserted at one side a rubber washer 30, whilst at the other side there is provided a rubber tube 31 slipped on the relative pin and urged by the washer 27 and nut 28 against the wedge so as to slightly clamp the latter and avoid eventual vibrations. On the rear, the wedge has a substantially spherical surface 32, against which the spherical head of an adjusting screw 33 operates, said screw being threaded in the bottom of the recess and provided with a gripping hexagon 34 and a locking nut 35. Owing to the wedge slits 25 and 26, through which pins 21 and 22 respectively pass, the wedge can be displaced and adjusted by means of screw 33.

Wedges 23, mounted in the upper recesses 19, are intended to cooperate with edges 13c of the heads of the arms 13, whereas wedges 24, mounted in the lower recesses 20, are intended to cooperate with wedges 14c of the heads of the arms 14. As already stated, wedges 13c radially project less than wedges 14c, so that oscillable wedges 23 on the contrary project towards the interior of wedges 24 for a larger amount (see FIGURE 4). With respect to movement direction, the angle of the wedges is larger than the friction angle between the surfaces contacting to one another.

Operation of the above described rectilinear guide member seems to be evident.

During its axial movement, tube 12 is perfectly guided by seating of its sliding blocks 15 on the sliding ledges 5 and 6. Any transverse stress or torque operating on tube 12 is counter-balanced by reaction forces normally operating at the mutual contacting surfaces between the sliding blocks 15 and ledges 5, 6 and, owing to arrangement of the latter, beams 1, 2, 3 and 4 are urged by forces lying in the core plane. Elastic instability possibilities of the pressed beam flange are avoided by the contiguous beam having a high rigidity in the plane of the eventual deformation.

Owing to beam height and favourable configuration of the stressing forces, structure may be very light. Structure capability of being decomposed into simple members allows an easy, economic and accurate manufacture of the guide sliding ledges and mating surfaces. Assembly and disassembly may be very rapidly carried out.

When movable tube 12 arrives at stroke end position, urged by a suitable force (e.g. a hydraulic cylinder), it will be practically immobilized since clearances between sliding blocks 15 and sliding ledges are removed.

Initial adjustment of locking wedges 23 and 24 is as follows.

When tube 12 is at stroke end position, screws 33 are adjusted so as to bring all of the wedges 23 and 24 seated on the respective wedges 13c and 14c of the heads of the arms 13 and 14. Thence, by means of proper nuts 35 screws 33 are locked.

During subsequent operation, whenever tube 12 is brought to stroke end position, wedges 23 and 24 automatically orientate owing to free oscillation thereof, so that on the entire surface a complete seating is achieved and clearances are removed. Thus, a perfect fitting or joint of tube 12 is obtained.

Owing to the angle selected for wedges 23 and 24 (larger than friction angle), there will be no frictional stresses at separation, that is when tube 12 is again caused to descend or re-enter the guide.

Both on approach and on return of the arm heads from wedges 23 and 24, no rubbing occurs between the contacting surfaces and therefore wear thereof is avoided.

It is to be understood that the invention is not limited to the described and shown exemplifying embodiment.

Thus, guide member instead of being comprised of four double T-shaped beams could be comprised of only three triangularly disposed beams. In such a case, of course there will be only three arms, such as 13 and 14, carrying the sliding blocks.

Instead of being carried out by sections 7, 8, 9 and 10 with eight fastening points, rigid connection between the beams could be accomplished by means of suitably shaped members integral with the beam booms so as to reduce fastening points to a half.

Beams themselves may be identical (as shown) or not, and cores thereof may be of a different configuration from the one shown.

I claim:
1. A tubular rectilinear guide member for telescopically extensible rods, tubes, shafts and the like, characterized in being comprised of a plurality of double T-shaped beams, the cores of which form the guide walls and the booms of which are spaced and two by two rigidly connected to one another each double T-shaped beam having two parallel sliding surfaces at the outer surfaces opposite the two booms, said sliding surfaces being arranged at right angles to the beam core plane with the centre lines thereof lying in said plane.

2. A guide member according to claim 1 characterized in that the sliding surfaces are comprised of ledges secured to the beam booms.

3. A guide member according to claim 1 characterized by a plurality of union section members, the number of which corresponds to that of the beams and that are provided with mating surfaces so that each of them receives the booms of two contiguous beams, clamping means being provided to lock union members to the relative booms.

4. A guide member according to claim 1, characterized in that the beam booms have integral shaped members and that connecting members to lock mutually two by two said shaped members are provided for.

5. A guide member according to claim 1, characterized in being provided with clamping means for a movable member guided to stroke end position.

6. A guide member according to claim 5, characterized in that said clamping means comprise oscillable and adjustable wedges suitable to cooperate with corresponding surfaces of the movable guided member.

7. A guide member according to claim 6, characterized in that the wedge angle with respect to movement direction of a guided member is larger than the friction angle between mutually contacting surfaces.

References Cited

UNITED STATES PATENTS

| | | | |
|---|---|---|---|
| 1,910,534 | 5/1933 | Glosner | 308—3 |
| 2,176,666 | 10/1939 | Cook | 308—6 |
| 2,342,946 | 2/1944 | Le Tourneau | 308—3 |
| 2,356,641 | 8/1944 | Wolfle | 308—3 |
| 2,491,384 | 12/1949 | MacMillin | 308—3 |
| 2,581,022 | 1/1952 | Japikse | 308—3 |
| 2,582,889 | 1/1952 | Sedgwick | 308—3 |
| 2,755,147 | 7/1956 | Ernst | 308—3 |

MARTIN P. SCHWADRON, *Primary Examiner.*

L. L. JOHNSON, *Assistant Examiner.*